US010137625B2

(12) United States Patent
Sakellarides et al.

(10) Patent No.: US 10,137,625 B2
(45) Date of Patent: Nov. 27, 2018

(54) BIAXIALLY ORIENTED BIO-BASED POLYESTER FILMS AND LAMINATES

(75) Inventors: Stefanos L. Sakellarides, East Greenwich, RI (US); Keunsuk P. Chang, North Kingstown, RI (US)

(73) Assignee: TORAY PLASTICS (AMERICA), INC., North Kingstown, RI (US)

( * ) Notice: Subject to any disclaimer, the term of this patent is extended or adjusted under 35 U.S.C. 154(b) by 230 days.

(21) Appl. No.: 13/179,007

(22) Filed: Jul. 8, 2011

(65) Prior Publication Data

US 2013/0011631 A1 Jan. 10, 2013

(51) Int. Cl.
| | |
|---|---|
| B32B 3/10 | (2006.01) |
| C08G 63/672 | (2006.01) |
| C08G 63/183 | (2006.01) |
| C08G 63/199 | (2006.01) |
| C23C 16/04 | (2006.01) |
| B32B 27/36 | (2006.01) |
| B32B 27/06 | (2006.01) |
| B32B 15/09 | (2006.01) |
| B29C 47/06 | (2006.01) |
| C23C 16/44 | (2006.01) |
| C08G 63/189 | (2006.01) |
| C08G 63/88 | (2006.01) |
| B29C 47/00 | (2006.01) |
| B29C 47/92 | (2006.01) |
| B29C 55/02 | (2006.01) |
| B29C 55/12 | (2006.01) |
| B32B 27/18 | (2006.01) |
| B29K 67/00 | (2006.01) |
| B29C 65/00 | (2006.01) |
| B29L 31/00 | (2006.01) |
| B29C 65/48 | (2006.01) |
| B29C 65/18 | (2006.01) |
| B29C 65/82 | (2006.01) |

(52) U.S. Cl.
CPC ........ B29C 47/0057 (2013.01); B29C 47/065 (2013.01); B29C 47/92 (2013.01); B29C 55/023 (2013.01); B29C 55/12 (2013.01); B32B 15/09 (2013.01); B32B 27/06 (2013.01); B32B 27/18 (2013.01); B32B 27/36 (2013.01); *B29C 47/0004* (2013.01); *B29C 47/0021* (2013.01); *B29C 47/0066* (2013.01); *B29C 65/18* (2013.01); *B29C 65/48* (2013.01); *B29C 65/8215* (2013.01); *B29C 66/0042* (2013.01); *B29C 66/45* (2013.01); *B29C 66/71* (2013.01); *B29C 66/72341* (2013.01); *B29C 66/73713* (2013.01); *B29C 66/73715* (2013.01); *B29C 66/73791* (2013.01); *B29C 66/919* (2013.01); *B29C 66/91411* (2013.01); *B29C 66/91423* (2013.01); *B29C 66/929* (2013.01); *B29C 66/949* (2013.01); *B29C 2947/92704* (2013.01); *B29K 2067/003* (2013.01); *B29K 2995/0056* (2013.01); *B29L 2031/744* (2013.01); *B32B 2439/70* (2013.01); *Y10T 428/24802* (2015.01); *Y10T 428/31681* (2015.04); *Y10T 428/31786* (2015.04)

(58) Field of Classification Search
CPC .................................................. B32B 2439/70
USPC ...................................................... 428/195.1
See application file for complete search history.

(56) References Cited

U.S. PATENT DOCUMENTS

| | | | |
|---|---|---|---|
| 3,903,294 A * | 9/1975 | Abella | ........................ 264/235.8 |
| 4,011,358 A | 3/1977 | Roelofs | |
| 4,077,588 A | 3/1978 | Hurst | |
| 4,290,763 A | 9/1981 | Hurst | |
| 4,322,003 A | 3/1982 | Long | |
| 4,375,494 A | 3/1983 | Stokes | |
| 4,636,442 A | 1/1987 | Beavers et al. | |
| 4,704,325 A | 11/1987 | Crocker | |
| 4,778,431 A | 10/1988 | Dudley | |
| 4,917,646 A | 4/1990 | Kieves | |
| 5,108,339 A | 4/1992 | Kieves | |
| 5,145,833 A | 9/1992 | Prunier et al. | |
| 5,164,248 A | 11/1992 | Fleury et al. | |
| 5,209,972 A | 5/1993 | Super et al. | |
| 5,338,243 A | 8/1994 | Kieves | |
| 5,458,965 A | 10/1995 | Yoshinaka et al. | |
| 5,616,496 A | 4/1997 | Frost et al. | |
| 5,713,777 A | 2/1998 | Greenwald | |
| 5,770,301 A | 6/1998 | Murai et al. | |
| 5,853,862 A | 12/1998 | Murai et al. | |

(Continued)

FOREIGN PATENT DOCUMENTS

| | | |
|---|---|---|
| CN | 102582294 | 7/2012 |
| JP | 7-268189 | 10/1995 |

(Continued)

OTHER PUBLICATIONS

"Technology development for the production of biobased products from biorefinery carbohydrates—the US Department of Energy's Top 10 revisited," Green Chemistry, Mar. 2010, vol. 14, No. 4, p. 539-554.*
"Shelf Life of Packaged Foods, Its Measurement and Prediction," Robertson, CRC Press, 2000.*
Sargeant et al., U.S. Office Action dated Jun. 27, 2007, directed to U.S. Appl. No. 11/651,103; 9 pages.
Sargeant et al., U.S. Office Action dated Dec. 21, 2007, directed to U.S. Appl. No. 11/651,103; 8 pages.

(Continued)

*Primary Examiner* — Ian Rummel
(74) *Attorney, Agent, or Firm* — Morrison & Foerster LLP

(57) ABSTRACT

A laminate film including at least one bio-based polyester layer. The polyester layer has a radiocarbon ($^{14}$C) content of at least 21.5 pMC. The laminate film may further have additional layers such as a second bio-based polyester resin-containing layer of at least about 21.5 pMC radiocarbon content, a metal layer, or combinations thereof.

14 Claims, No Drawings

(56) References Cited

U.S. PATENT DOCUMENTS

| | | | |
|---|---|---|---|
| 5,856,017 A * | 1/1999 | Matsuda et al. | 428/446 |
| 5,882,747 A | 3/1999 | Bria et al. | |
| 5,935,903 A | 8/1999 | Goss et al. | |
| 5,942,320 A | 8/1999 | Miyake et al. | |
| 5,958,552 A | 9/1999 | Fukuda et al. | |
| 6,034,813 A | 3/2000 | Woodard et al. | |
| 6,103,368 A | 8/2000 | Fukuda et al. | |
| 6,188,512 B1 | 2/2001 | Woodard et al. | |
| 6,194,054 B1 | 2/2001 | Peiffer et al. | |
| 6,214,440 B1 | 4/2001 | Peiffer et al. | |
| 6,221,112 B1 | 4/2001 | Snider | |
| 6,221,191 B1 | 4/2001 | Davis et al. | |
| 6,291,053 B1 | 9/2001 | Peiffer et al. | |
| 6,303,228 B1 | 10/2001 | Watanabe et al. | |
| 6,391,410 B1 | 5/2002 | Peiffer et al. | |
| 6,416,872 B1 | 7/2002 | Maschwitz | |
| 6,436,544 B1 | 8/2002 | Veyrat et al. | |
| 6,455,141 B1 | 9/2002 | Woodard et al. | |
| 6,543,208 B1 | 4/2003 | Kobayashi et al. | |
| 6,607,815 B2 | 8/2003 | Bartsch et al. | |
| 6,743,512 B2 | 6/2004 | Murata et al. | |
| 6,803,113 B2 | 10/2004 | Porter et al. | |
| 6,811,867 B1 | 11/2004 | McGurran et al. | |
| 7,115,320 B2 | 10/2006 | Tanaka et al. | |
| 7,238,401 B1 | 7/2007 | Dietz | |
| 7,799,399 B2 | 9/2010 | Sargeant et al. | |
| 7,919,158 B2 | 4/2011 | Seth et al. | |
| 2001/0019759 A1 | 9/2001 | Barattucci et al. | |
| 2002/0028862 A1 | 3/2002 | Johnson et al. | |
| 2002/0094396 A1 | 7/2002 | Ward et al. | |
| 2002/0182389 A1 | 12/2002 | Döbler | |
| 2004/0076821 A1 * | 4/2004 | Janssens et al. | 428/327 |
| 2004/0166337 A1 | 8/2004 | Chang et al. | |
| 2005/0119359 A1 * | 6/2005 | Shelby et al. | 521/50 |
| 2005/0208282 A1 * | 9/2005 | Wood et al. | 428/216 |
| 2009/0022919 A1 | 1/2009 | Chicarella et al. | |
| 2009/0226991 A1 | 9/2009 | Feldman et al. | |
| 2009/0246430 A1 | 10/2009 | Kriegel et al. | |
| 2009/0323180 A1 | 12/2009 | Weber et al. | |
| 2010/0028512 A1 | 2/2010 | Kriegel et al. | |
| 2010/0068493 A1 | 3/2010 | Jesberger et al. | |
| 2010/0314243 A1 | 12/2010 | Frost et al. | |
| 2011/0076733 A1 | 3/2011 | Urano et al. | |
| 2011/0087000 A1 | 4/2011 | Peters et al. | |
| 2011/0120902 A1 | 5/2011 | Boswell et al. | |
| 2011/0287199 A1 | 11/2011 | Chicarella et al. | |
| 2011/0287200 A1 | 11/2011 | Chicarella et al. | |
| 2013/0344264 A1 | 12/2013 | Chicarella et al. | |
| 2013/0344345 A1 | 12/2013 | Sakellarides et al. | |
| 2014/0004286 A1 | 1/2014 | Sakellarides et al. | |

FOREIGN PATENT DOCUMENTS

| | | |
|---|---|---|
| WO | WO-89/08558 | 9/1989 |
| WO | WO-2004/016417 | 2/2004 |

OTHER PUBLICATIONS

Sargeant et al., U.S. Office Action dated Jul. 10, 2008, directed to U.S. Appl. No. 11/651,103; 11 pages.

Sargeant et al., U.S. Office Action dated Jun. 1, 2009, directed to U.S. Appl. No. 11/651,103; 15 pages.

Sargeant et al., U.S. Office Action dated Feb. 22, 2010, directed to U.S. Appl. No. 11/651,103; 8 pages.

Chicarella et al., U.S. Office Action dated Jan. 23, 2012, directed to U.S. Appl. No. 13/196,495; 6 pages.

Chicarella et al., U.S. Office Action dated Dec. 23, 2011, directed to U.S. Appl. No. 13/196,554; 6 pages.

Chicarella et al., U.S. Office Action dated Aug. 19, 2011, directed to U.S. Appl. No. 12/202,655; 6 pages.

Chicarella et al., U.S. Office Action dated Mar. 5, 2012, directed to U.S. Appl. No. 12/202,655; 5 pages.

International Search Report and Written Opinion, dated Oct. 26, 2007, directed to International Application No. PCT/US07/13164; 9 pages.

Extended Search Report dated Nov. 17, 2011, directed to European Application No. 07777400.8; 8 pages.

Office Action dated Feb. 23, 2011, directed to Mexican Application No. MX/a/2008/015570; 2 pages.

Furlong, K. (Mar. 28, 2012). "Commercializing BioFormPX(tm)," *Virent Presentation at BioPlastek 2012*: 30 pages.

Huang, S. (Mar. 28, 2012). "Coca-Cola's Roadmap Towards 100% Renewable Packaging," *Coca-Cola Presentation at BioPlastek 2012*: 30 pages.

Julian, A. (Jun. 2011). "Transforming an Industry—Capturing the Promise of 100% Bio-based Polymers," *Draths Corporation Presentation at BioPlastek 2011*: 27 pages.

"Explanation of Results—Biobased Analysis using ASTM D6866," located at <http://www.betalabservices.com/PDF/ASTM-D6866-Example-Report-JP.pdf> (6 pages).

Roerink, F. "Avantium's YXY: Green Materials and Fuels," 2nd Annual Bio-Based Chemicals Summit, Feb. 15, 2011; 24 pages.

Chicarella et al., U.S. Office Action dated Oct. 4, 2012, directed to U.S. Appl. No. 12/202,655; 6 pages.

Gandini et al. (2009). "The Furan Counterpart of Poly(ethylene terephthalate): An Alternative Material Based on Renewable Resources," Journal of Polymer Science: Part A Polymer Chemistry 47(1):295-298.

Sakellarides et al., U.S. Office Action dated Jul. 23, 2013, directed to U.S. Appl. No. 13/535,153; 10 pages.

Sakellarides et al., U.S. Office Action dated Dec. 24, 2013, directed to U.S. Appl. No. 13/535,153; 13 pages.

"Thermal Transfer Printing," located at <http://en.wikipedia.org/wiki/Thermal_transfer_printing> visited on Apr. 8, 2014. (2 pages).

LaPorte, G. M. et al. (2003). "The Forensic Analysis of Thermal Transfer Printing," *Journal of Forensic Sciences*, 48(5): 1163-1171.

Sakellarides et al., U.S. Office Action dated Aug. 28, 2014, directed to U.S. Appl. No. 13/874,141; 9 pages.

Chicarella et al., U.S. Office Action dated Dec. 24, 2014, directed to U.S. Appl. No. 13/729,805, 14 pages.

Sakellarides et al., U.S. Office Action dated Nov. 14, 2014, directed to U.S. Appl. No. 13/535,153; 11 pages.

Sakellarides et al. U.S. Office Action dated Dec. 4, 2017, directed to U.S. Appl. No. 13/874,141; 9 pages.

PolyPrint, "Oxygen Transmission Rate," as retrieved from http://www.polyprint.com/flexographic-otr.htm; 3 pages.

Sakellarides et al., U.S. Office Action dated May 4, 2015, directed to U.S. Appl. No. 13/535,153; 14 pages.

Sakellarides et al., U.S. Office Action dated May 20, 2015, directed to U.S. Appl. No. 13/874,141; 11 pages.

Sakellarides et al., U.S. Office Action dated Jun. 1, 2015, directed to U.S. Appl. No. 14/139,434; 5 pages.

Sakellarides et al., U.S. Office Action dated Nov. 18, 2015, directed to U.S. Appl. No. 14/139,434; 6 pages.

Sakellarides et al. U.S. Office Action dated Jun. 1, 2016, directed to U.S. Appl. No. 13/874,141; 8 pages.

Sakellarides et al., U.S. Office Action dated Jun. 24, 2016, directed to U.S. Appl. No. 14/139,434; 5 pages.

Sakellarides et al., U.S. Office Action dated Jan. 9, 2017, directed to U.S. Appl. No. 13/874,141; 8 pages.

Sakellarides et al. U.S. Office Action dated Jun. 26, 2017, directed to U.S. Appl. No. 13/874,141; 8 pages.

\* cited by examiner

BIAXIALLY ORIENTED BIO-BASED POLYESTER FILMS AND LAMINATES

FIELD OF INVENTION

This invention relates to biaxially oriented films including a bio-based polyester that is derived from non-petroleum-sourced monomers. This invention also relates to multi-layer biaxially oriented polyester films and laminates of same, which are made from at least one bio-based polyester building block, such as bio-based ethylene glycol or bio-based terephthalic acid.

BACKGROUND OF INVENTION

Biaxially oriented polyester films are used for packaging, industrial, electronic, decorative, and label applications and often perform multiple functions. In particular, biaxially oriented PET films and laminations are popular, high performing, and cost-effective flexible substrates for a variety of snack food packaging applications. Such packaging films must sometimes perform in a lamination to provide printability, transparent or matte appearance, or slip properties; they sometimes must provide a surface suitable for receiving organic or inorganic coatings for gas and moisture barrier properties; they sometimes must provide a heat sealable layer for bag forming and sealing, or a layer that is suitable for receiving an adhesive either by coating or laminating.

In recent years, interest in "green" packaging has been strongly developing. Packaging materials based on biologically derived polymers are increasing due to concerns with non-renewable resources, raw materials, and greenhouse gas generation. Bio-based polymers are derived from renewable or sustainable sources such as plants. These polymers are believed—once fully scaled-up—to reduce reliance on petroleum, reduce production of greenhouse gases. Bio-based polymer such as polylactic acid (PLA)—which is currently derived from corn starch—is one of the more popular and commercially available materials that can be used for packaging film applications.

For such a bio-based polymer to be fit-for-use for many snack food packaging applications, it is desirable that the bio-based polymer films match as many of the attributes possible of conventional packaging materials, for example, conventional multi-layer biaxially-oriented PET. Desirable attributes of conventional PET that are preferably met include thermal and dimensional stability, heat sealability, printability, controlled coefficient of friction (COF), metallizability, gas transmission barrier, etc.

In particular, for high barrier packaging, metallized bio-based oriented films should demonstrate good oxygen and moisture barrier properties. For example, in the case of a metallized oriented PLA, good oxygen barrier properties are generally easily achieved due to the polar nature of PLA, which provides good hydrogen-bonding of the polymer molecules. However, this polar nature tends to be detrimental for achieving high moisture barrier. Without being bound by any theory, the thought is that water molecules—being polar themselves—may more easily migrate through a polar polymer film than a non-polar polymer film. In addition, it is possible that the PLA substrate can absorb moisture and swell, thus changing the physical and dimensional properties of the PLA substrate. In particular, such swelling—especially at the interface between the vapor-deposited metal in a metallized PLA film and the adjacent PLA substrate surface—can cause morphological and dimensional changes in which the relatively inflexible inorganic metal layer can not conform to. This can then result in cracking of the metal layer and attendant loss of gas barrier properties. Biaxially oriented PET (BOPET) films, however, exhibit excellent oxygen gas barrier properties and reasonably good moisture barrier properties due to its high $T_g$, crystallinity, and aromatic structure. BOPET is less subject to swelling and dimensional changes due to moisture, although it does share some of the sensitivity to moisture that biaxially oriented PLA (BOPLA) does due to its polar nature.

There are other issues inherent with bio-polymers such as PLA used in flexible packaging applications. BOPLA typically has lower thermal resistance and higher heat shrinkage than BOPET which can be a problem in downstream processes seen in converting such as drying temperatures after printing or coating, extrusion lamination, and metallizing. In fact, the high thermal resistance and dimensional stability of BOPET films is what make them useful and attractive in many applications. In addition, from an end-user standpoint, the high stiffness of BOPLA packaging can make it prone to dead-fold issues whereby the package can be easily creased, causing a shelf-worn appearance; and furthermore, the BOPLA package can be much noisier than a BOPET package which can be a complaint from the consumer.

However, if BOPET packaging can be made from bio-based sources instead of petroleum sources, this would solve the converting, end-user, and consumer concerns that BOPLA packaging entails, while reducing reliance on petroleum, reducing overall potential carbon footprint, and all the packaging to be produced from a sustainable resource (plants). The only drawback would be that unlike BOPLA or some other bio-polymers, BOPET would not be compostable or degradable without modifying additives. However, without being bound by any theory, a bio-based/sourced BOPET could be a way to sequester carbon dioxide from the atmosphere as the source plant material could take in $CO_2$ from the atmosphere which is then converted to polyesters such as polyethylene terephthalate and then converted to polyester packaging which does not degrade and return $CO_2$ to the atmosphere.

Coca-Cola Company's US Publication No. 20090246430A1 states that "It is known in the art that carbon-14 (C-14), which has a half life of about 5,700 years, is found in bio-based materials but not in fossil fuels. Thus, 'bio-based materials' refer to organic materials in which the carbon comes from non-fossil biological sources. Examples of bio-based materials include, but are not limited to, sugars, starches, corns, natural fibers, sugarcanes, beets, citrus fruits, woody plants, cellulosics, lignocellulosics, hemicelluloses, potatoes, plant oils, other polysaccharides such as pectin, chitin, levan, and pullulan, and a combination thereof." The detection of C-14 is indicative of a bio-based material. C-14 levels can be determined by measuring its decay process (disintegrations per minute per gram carbon or dpm/gC) through liquid scintillation counting. This reference teaches the use of bio-based ethylene glycols and terephthalic acids to form a bio-based polyethylene terephthalate resin useful for beverage bottles.

US Publication No. 20100028512A1 describes a method of producing bio-based polyester terephthalate (PET) resin which may then be used to make articles, containers, or packaging for food and beverage products. The application also discloses the use of bio-based polyethylene to produce closures, caps, or lids for bio-based PET containers as well as the use of bio-based polyethylene labels via film extrusion for the containers. However, there is no contemplation of producing bio-based polyethylene terephthalate films for packaging applications.

It is the objective of this invention to provide a method for producing useful films and laminations using bio-based polyethylene terephthalate homopolymers and copolymers for various packaging applications. Such bio-based polyester articles will contain a certain amount of $^{14}C$-isotope, a quantity that is thus distinguishable from petroleum-based polyesters. These bio-based polyesters are made from, in turn, bio-based monomers, which are derived from plant-based intermediates such as alcohols and sugars.

SUMMARY OF THE INVENTION

The above issues of making high gas and moisture barrier metallized BOPET films and laminations from at least partially bio-based polyethylene terephthalate homopolymers and copolymers are addressed. The inventors have found solutions whereby the use of such materials in packaging, consumer, and industrial applications can maintain current levels of quality, processability, and capital assets while reducing net carbon dioxide emissions.

Bio-based polyethylene terephthalate or other polyesters differ from conventional petroleum-based polyesters in that $^{14}C$-isotope measurements show that the quantity of $^{14}C$ in bio-sourced materials is significantly higher than in petroleum-based materials due to the continual uptake of this isotope by living plants and organisms. In petroleum-derived polyethylene terephthalate, however, $^{14}C$-isotope is essentially undetected using ASTM International standards (ASTM D6866). This is due to the half-life of $^{14}C$ (about 5730±40 years) and the decay of this isotope over the hundreds of millions of years since the original organisms existed, took up the $^{14}C$, and turned into petroleum. Thus, bio-based or bio-sourced polyesters may be characterized by the amount of $^{14}C$ they contain. The decay of $^{14}C$ isotope is famously known for radiocarbon-dating of archeological, geological, and hydrogeological artifacts and samples and is based on its activity of about 14 disintegrations per minute (dpm) per gram carbon.

ASTM D6866 measures the amount of $^{14}C$ isotope (also known as "radiocarbon") in the polyester and compares it to a modern reference standard. This ratio of measured $^{14}C$ to the standard can be reported as "percent modern carbon" (pMC). Petroleum or fossil fuel-based polyester will have essentially 0% radiocarbon (0 pMC) whereas contemporary 100% bio-based or bio-mass polyester should have about or near 100% radiocarbon (107.5 pMC). It is preferable that the ratio of biomass-based polyester to petroleum-based polyester in layer B be at least 1 pMC, and more preferably 21.5 pMC, and even more preferably, about 107.5 pMC.

One embodiment is a laminate film including a first bio-based polyester resin-containing layer B, the bio-based polyester selected from the group of polyethylene terephthalate, polyethylene naphthalate, polybutylene terephthalate, polytrimethylene terephthalate, polyethylene terephthalate-co-isophthalate copolymer, polyethylene terephthalate-co-naphthalate copolymer, polycyclohexylene terephthalate, polyethylene-co-cyclohexylene terephthalate, etc. and other ethylene glycol or terephthalic acid-based polyester homopolymers and copolymers and blend combinations thereof. This first bio-based polyester resin-containing layer B could be considered a base or core layer.

In a further embodiment, the laminate could include a second polyester resin-containing layer A contiguously attached upon one side of the first bio-based polyester resin-containing layer B. This second polyester resin-containing layer A could be either a petroleum-based polyester or a bio-based polyester like the first layer B. Preferably, this second layer A is also a bio-based polyester resin-containing layer of at least 1.0 pMC, preferably at least about 21.5 pMC, and more preferably, about 107.5 pMC. Furthermore, the laminate could further embody a third polyester resin-containing layer C contiguously attached on the side of the first bio-based polyester resin-containing core layer B, opposite the second polyester resin-containing A. Preferably, as with the second polyester layer A, the third polyester resin-containing layer C also includes a bio-based polyester of at least 1.0 pMC, preferably at least about 21.5 pMC, and more preferably, about 107.5 pMC. Other embodiments could include or contemplate additional intermediate layers between the layers A and B and between the layers B and C. Such intermediate layers of the multi-layer structure may be symmetrically or asymmetrically disposed around the bio-based polyester core layer B. Preferably, such intermediate layers also include bio-based polyesters or bio-based polyolefins for the purpose of ensuring as high a content of bio-sourced sustainable materials in the overall multi-layer laminate film structure. Preferably, the intermediate layers should be at least 1.0 pMC, preferably at least about 21.5 pMC and more preferably, about 107.5 pMC.

Preferably, the second bio-based polyester resin-containing layer A includes a formulation suitable for receiving a metal layer via vapor deposition by processes well-known in the art, preferably including aluminum with a thickness of about 5-100 nm and optical density of about 1.5-5.0. Additionally, this layer can also be suitably formulated for receiving printing inks or coatings as desired. Layer A is a preferably bio-based polyester selected from, but not limited to, polyethylene terephthalate homopolymer, polyethylene terephthalate copolymers with isophthalic acid, naphthalate dicarboxylic acid, cycloehexane dimethanol (CHDM), diethylene glycol, butanediol, propanediol, adipic acid, sebacic acid, azelaic acid, hexylenediol, and/or blends thereof to achieve good metal adhesion or printing ink adhesion. The outer surface of layer A (the surface opposite the side in contiguous contact with layer B) may be discharge-treated by various means in the art (e.g. corona discharge treatment, flame treatment, controlled atmosphere corona treatment, atmospheric plasma treatment) so as to raise further the surface energy/wetting tension of the surface to make it more receptive for metal deposition or ink adherence. Other means of enhancing the suitability of the surface for the reception of metal deposition, inks, adhesives, etc., may be achieved by chemical treatments or coatings. In addition, an amount of antiblock may be incorporated into the bio-based polyester layer A including an antiblock component selected from, but not limited to, amorphous silica, aluminosilicate, sodium calcium aluminum silicate, crosslinked silicone polymer, polymethylmethacrylate, and/or blends thereof.

Preferably, the third bio-based polyester resin-containing layer C includes a heat-sealable amorphous polyester selected from, but not limited to, polyethylene terephthalate copolymers with co-monomers such as isophthalic acid, cyclohexane dimethanol, and/or blends with polyethylene terephthalate homopolymers thereof. This preferably bio-based heat-sealable layer C also includes an antiblock component selected from, but not limited to, amorphous silica, aluminosilicate, sodium calcium aluminum silicate, crosslinked silicone polymer, polymethylmethacrylate, and/or blends thereof.

Alternatively, the third bio-based polyester resin-containing layer C could also include a non-heat-sealable winding layer including a bio-based crystalline polyester and an inorganic antiblocking agent for controlling COF. This nonheat-sealable winding layer can include a crystalline polyester homopolymer with an antiblock component selected from, but not limited to, amorphous silicas, aluminosilicates, sodium calcium aluminum silicate, a crosslinked silicone polymer, and polymethylmethacrylate. Preferably, the crystalline polyester homopolymer is made from bio-sourced polyester building blocks. In this embodiment, the winding layer may also be a discharge-treated or chemically-treated winding layer having a surface for lamination or coating with adhesives or inks.

Another embodiment is a method for flexible packaging a product. The method includes obtaining a laminate film including a bio-based polyester resin-containing layer and surrounding a product by the laminate film. Preferably, the product is a food product.

In yet another embodiment, this invention provides biaxially oriented bio-based polyester multi-layer films for flexible packaging purposes. Another embodiment provides a metallized biaxially oriented bio-based polyester multi-layer barrier films. An additional embodiment provides laminate structures of bio-based polyester layers and metallized layers for barrier applications in flexible packaging or in decorated balloons. An additional embodiment is monolayer biaxially oriented polyester films for use in thermal transfer ribbons. Another embodiment is monolayer or multilayer biaxially oriented polyester film containing UV absorber additives for use in solar window film structures. Another embodiment would be white polyester film for use in outdoor applications such as advertising signs or photovoltaic back panels.

Yet another embodiment of a laminate bio-based polyester film includes a bio-based polyester resin-containing layer having a radiocarbon content of at least 21.5 pMC. The film may be biaxially oriented. The bio-based polyester resin-containing layer may include crystalline polyethylene terephthalate. The film may include one or more additional layers comprising bio-based polyesters. The additional layers may include, for example, bio-based polyethylene terephthalate homopolymer, bio-based polyethylene terephthalate-co-isophthalate copolymer, or bio-based polyethylene 2,5-furane dicarboxylate homopolymer.

The bio-based polyester resin-containing layer may include polyester derived from plant sugars. The surface of the laminate bio-based polyester film may be discharge-treated. A metal layer, for example an aluminum layer, may be deposited on the discharge-treated surface. The metal layer may have an optical density of 1.5-5.0.

Another embodiment of an lamination includes a biaxially oriented bio-based polyester film (A) include at least about 21.5 pMC, a biaxially oriented bio-based polyester film (B) including at least about 21.5 pMC, and an adhesive that laminates polyester film (A) to polyester film (B).

An embodiment of a method of making a laminate film may include co-extruding a biaxially oriented bio-based polyester film (A) comprising at least about 21.5 pMC and a biaxially oriented bio-based polyester film (B) comprising at least about 21.5 pMC.

An embodiment of a shrinkable label includes polyethylene 2,5-furane dicarboxylate homopolymer of at least about 80.6 pMC.

Additional advantages of this invention will become readily apparent to those skilled in this art from the following detailed description, wherein preferred embodiments of this invention are shown and described. As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION OF THE INVENTION

Described are biaxially oriented films including a bio-based polyester which is derived from non-petroleum-sourced monomers. Also described are multi-layer biaxially oriented polyester films and laminates of same, which are made from at least one bio-based polyester building block, such as bio-based ethylene glycol or bio-based terephthalic acid. One example of such a film-forming polyester is polyethylene terephthalate (abbreviated as "PET") homopolymer or copolymer with one or both of its major monomer building blocks, terephthalic acid or ethylene glycol, derived from biological sources. Such films exhibit excellent properties, including gas barrier properties particularly after metallizing, substantially equivalent to their petroleum-based counterparts, while being derived wholly or partly from non-petroleum sources.

In one embodiment, the bio-based PET polymer includes at least about 0.1 dpm/gC (disintegrations per minute per gram carbon) of C-14." This is a useful definition of bio-based materials to distinguish them from their traditional petroleum-based counterparts.

In another embodiment, the biaxially oriented polyester film includes at least 21.5 pMC, preferably 53 pMC, containing bio-based polyester of about at least 32%, and preferably, 100% biomass content. The film includes at least a single layer B as a base or core layer. The content or percentage of the film of bio-based origin is determined by comparing the amount of radiocarbon ($^{14}$C isotope) to a modern reference sample. Radiocarbon (also known as "carbon 14", "C-14", or "$^{14}$C") is a weakly radioactive, naturally occurring element in all living organisms. $^{14}$C is taken up continuously by the organism (plant or animal) over its lifetime; when the organism dies (or is harvested such as sugar cane or corn or other crops), this $^{14}$C uptake ceases. Thus, contemporary biomass—or materials and articles made from such biomass—has a significant amount of radiocarbon, typically about 100% radiocarbon. In comparison, fossil fuels such as coal and petroleum oil have typically about 0% radiocarbon. This is because fossil fuels and petroleum were formed hundreds of millions of years in the past from buried plants and algae to form coal and petroleum deposits. The algae and plants from that time period ceased uptake of $^{14}$C and—as $^{14}$C has a half-life of about 5730 years, over those 300 million years or so since the original algae and plants died and turned into fossil fuels—the $^{14}$C isotope in them decayed to the point where such fossil fuels essentially contain zero radiocarbon. By comparing the amount of $^{14}$C in a bio-based polyester film to a "modern reference standard," this ratio can be representative of a percent biomass content of the film with the units "pMC" (percent modern carbon).

The "modern reference standard" used in radiocarbon dating is a NIST (National Institute of Standards and Technology) standard with a known radiocarbon content equivalent to about the year 1950 AD. The year 1950 was chosen since it was the year that calibration curves for radiocarbon dating were established and also was a useful marker year prior to large-scale thermo-nuclear weapons testing which altered the global ratio of $^{14}$C to $^{12}$C. This standard represents 100 pMC. Present day (post-1950 AD) articles made from contemporary biomass sources typically show pMC greater than 100 due to the increase of $^{14}$C due to nuclear weapons testing (also known as "bomb carbon"). At the time of this writing, contemporary biomass-sourced articles have about 107.5 pMC. Thus, bio-based polyesters, e.g. polyethylene terephthalate using exclusively as diol component ethylene glycol recently derived from sugar cane or corn starches (which were subsequently fermented to ethanol or methanol and converted to ethylene, and then to ethylene oxide and ethylene glcol) and also using exclusively as diacid component terephthalic acid derived from biomass, would show a pMC of about 107.5. Fossil fuel/petroleum-based articles or polyesters would have a pMC of about 0. Thus, conventionally, it has been useful and convenient to assign a value of "100% biomass content" to articles that exhibit about or near 107.5 pMC and "0% biomass content" to articles that exhibit about or near 0 pMC. In this way, one can calculate and assign a percent biomass content to articles that include both bio-based carbon and fossil fuel-based carbon. For example, a polyethylene terephthalate film made from a bio-based ethylene glycol source and a conventional (petroleum-based) terephthalic acid would have 20 wt % bio-sourced carbon atoms (since in the PET repeat unit there are 2 carbon atoms coming from ethylene glycol and 8 carbon atoms coming from terephthalic acid) and would exhibit a pMC of about 21.5. This would equate to about "30% biomass content" for the film (Reference material from Beta Analytic Inc. website www.betalabservices.com "Explanation of Results—Biobased Analysis using ASTM D6866").

In some embodiments, the bio-based film layer B is a crystalline polyethylene terephthalate and can be uniaxially or biaxially oriented. These resins have intrinsic viscosities between 0.60 and 0.85 dl/g, a melting point of about 255-260° C., a heat of fusion of about 30-46 J/g, and a density of about 1.4. The pMC value of these crystalline polyesters is preferably at least about 21.5, and more preferably about 107.5. The bio-based resin layer B is typically 2 μm to 350 μm in thickness after biaxial orientation, preferably between 3 μm and 50 μm, and more preferably between 12 μm and 23 μm in thickness.

The layer can further include other additives. Preferred additives in the layer include antiblock and slip additives. These are typically solid particles dispersed within the layer effectively to produce a low coefficient of friction on the exposed surface of the layer. This low coefficient of friction helps the film to move smoothly through the film formation, stretching and wind-up operations. Without such antiblocking and slip additives, the outer surfaces would be more tacky and would more likely cause the film being fabricated to stick to itself and to processing equipment causing excessive production waste and low productivity.

Examples of antiblock and slip additives that may be used for polyester film applications include amorphous silica particles with mean particle size diameters in the range of 0.050-0.1 μm at concentrations of 0.1-0.4 mass-percent, calcium carbonate particles with a medium particle size of 0.3-1.2 μm at concentrations of 0.03-0.2 mass-percent. Precipitated alumina particles of sub-micron sizes may be used with an average particle size, for example, having a medium particle size of about 0.1 μm and a mass-percent of 0.1-0.4. Additional examples include inorganic particles, aluminum oxide, magnesium oxide, and titanium oxide, such complex oxides as kaolin, talc, and montmorillonite, such carbonates as calcium carbonate, and barium carbonate, such sulfates as calcium sulfate, and barium sulfate, such titanates as barium titanate, and potassium titanate, and such phosphates as tribasic calcium phosphate, dibasic calcium phosphate, and monobasic calcium phosphate. Two or more of these may be used together to achieve a specific objective. As examples of organic particles, vinyl materials as polystyrene, crosslinked polystyrene, crosslinked styrene-acrylic polymers, crosslinked acrylic polymers, crosslinked styrene-methacrylic polymers, and crosslinked methacrylic polymers, as well as such other materials as benzoguanamine formaldehyde, silicone, and polytetrafluoroethylene may be used or contemplated.

The polyester resin layer preferably includes 50 to 100 ppm of a conductive metal compound, preferably manganese (Mg) and/or magnesium (Mn). The conductive metal compound can be added during the polymerization process as a catalyst or additive, or during the extrusion process in a masterbatch form to secure enough conductivity for electric pinning in the film-making process. Less than 50 ppm of the metal compound may cause pinning issues, more than 100 ppm of the metal compound may degrade the hydrolysis and transparency performance.

Examples of manganese compounds that may be used include manganese chloride, manganese bromide, manganese nitrate, manganese carbonate, manganese acetylacetonate, manganese acetate tetrahydrate, and manganese acetate dihydrate. Examples of magnesium compounds that may be used include magnesium chlorides and carboxylates. Magnesium acetate is a particularly preferred compound.

Additional additives, for example, phosphorous (P) can be used to suppress coloring (yellowness) of the polyester and can be added in an amount of between 30 to 100 ppm. Less than 30 ppm may not sufficiently reduce undesirable coloring of the film, but more than 100 ppm may make the film hazier.

The phosphorus-based compound is preferably a phosphoric acid-based compound, a phosphorous acid-based compound, a phosphonic acid-based compound, a phosphinic acid-based compound, a phosphine oxide-based compound, a phosphonous acid-based compound, a phosphinous acid-based compound, or a phosphine-based compound from the standpoint of thermal stability, suppression of debris, and improving hue. Phosphoric acid-based and phosphonic acid-based compounds are particularly preferable.

The bio-based crystalline polyester resin can be polymerized by polycondensation between two or more building blocks with diacid and diester functionality, at least one of which is plant-sourced. One process or method to produce such plant-sourced monomer, namely ethylene glycol, is to ferment sugar cane or other plant sugars and starches and distill into ethanol (CH3-CH2-OH). Through a dehydration process using mineral acids, strong organic acids, suitable catalysts and combinations thereof, the ethanol can be converted to ethylene monomer (CH2=CH2), which in turn can be oxidized into ethylene oxide

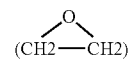

from which ethylene glycol (HO—CH2-CH2-OH) is derived by hydrolysis. One convenient low-cost source of sugar is the molasses generated as a by-product during the manufacture of sugar.

Diacids can also be derived from plant sources. For example there are several routes published for deriving terephthalic acid from biomass. Some of those routes are described in US Publication No. 2009/0246430 A1: one route involves extracting limonene from at least one bio-based material (for example citrus fruit peels), converting the limonene to at least one terpene, converting the terpene to p-cymene, and oxidizing the p-cymene to terephthalic acid:

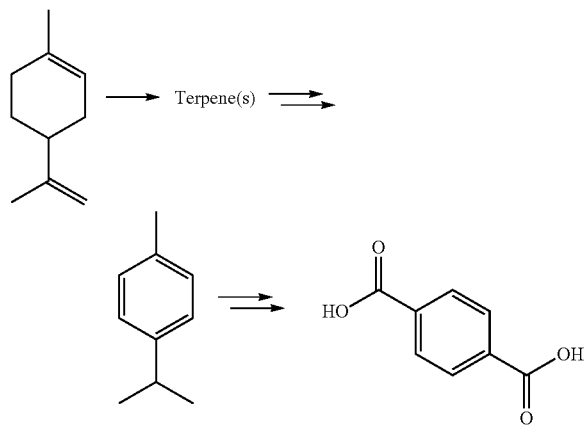

Another possible route to bio-terepththalic acid described in US Publication No. 2009/0246430 A1 is through extraction of hydroxymethylfurfural from a bio-based material, such as corn syrup, sugars, or cellulose, converting hydroxymethylfurfural to a first intermediate, reacting the first intermediate with ethylene (which can also be derived from bio-sources such as described in paragraph 23) to form a second intermediate, treating the second intermediate with an acid in the presence of a catalyst to form hydroxymethyl benzaldehyde and oxidizing hydroxymethylbenzaldehyde to terephthalic acid.

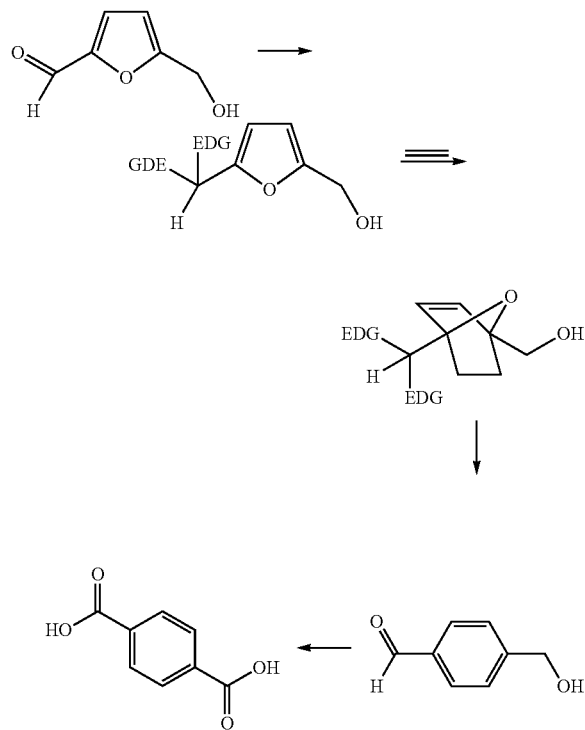

Another bio-derivative of plant-based hydroxymethylfurfural is 2,5-furandicarboxylic acid,

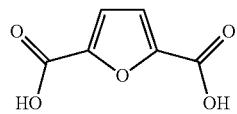

(FDCA) derived by a catalytic oxidation.

FDCA can be used as the bio-diacid source for preparing polyester films. For example, condensation of FDCA with ethylene glycol provides polyethylene 2,5-furanedicarboxylate (PEF); preparation and physical properties of PEF are described by A. Gandini et al. (Journal of Polymer Science Part A: Polymer Chemistry Vol. 47, 295-298 (2009): its melting and crystallization behavior follow the same pattern as those of PET (i.e. a crystallization rate slow enough for its melt to be able to be quenched into the amorphous state but high enough to enable achieving high crystallinity by heating from amorphous or cooling from the melt; these attributes are essential for a drop-in adaptation in a PET-type biaxially oriented film manufacturing process), with a glass transition temperature (following quenching) at 75-80° C. and a melting temperature of 210° C. (45° C. lower than that of PET).

A conference presentation by the Avantium Company ("Avantium's YXY: Green Materials and Fuels", 2$^{nd}$ Annual Bio-Based Chemicals Summit, Feb. 15, 2011) reports that PEF has been processed into bottles and film with superior gas and moisture barrier properties vs. PET; however, the presentation makes no mention of multilayer or laminated films containing PEF. Also there is no mention of taking advantage of the lower melting temperature of PEF for the purpose of utilizing it in the heat-sealable layer of a coextruded film. Furthermore such a PEF film might exhibit, in view of its lower melting point, higher thermal shrinkage versus PET at the same temperature and thus, it may find application as a shrinkable label for a PET bottle. Today different polymeric materials are used as shrinkable labels, e.g. amorphous materials such as polystyrene, PVC, or PETG. The use of such materials makes the empty bottles difficult to recycle without removing the label first. However, a PEF label will not need to be removed prior to recycle, since the material can be crystallized and reprocessed similar to PET and—at the levels present (as label weight versus bottle weight)—will be compatible with PET and not expected to significantly affect the physical properties of the article derived from recycling and reprocessing. A bio-based PEF film material can have pMC ranging between about 80.6 and 107.5 depending on whether only the FDCA component or both the FDCA and EG are bio-sourced.

Another route towards bio-based terephthalic acid is through the intermediate preparation of trans, trans muconic acid

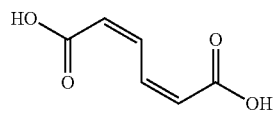

from biomass. A preparation method for cis, cis and cis, trans muconic acid from biomass (such as starches, sugars, plant material, etc.) through the biocatalytic conversion of glucose and others sugars contained therein, is described in U.S. Pat. No. 5,616,496. A subsequent isomerization of the above isomer mix into trans, trans muconic acid, necessary for conversion into terephthalic acid by reacting with dienophiles is described in US Publication No. 20100314243.

Yet another route towards bio-based terephthalic acid is converting carbohydrates derived from corn or sugarcane and potentially from lignocellulosic biomass into bio-isobutanol via fermentation by employing appropriate yeasts. Such processes are described for example in US Publication Nos. 20090226991 and 20110076733. The biologically-sourced isobutanol in turn is converted to para-xylene through a series of intermediate steps, according to procedures such as those described in US Publication No. 20110087000. The bio-sourced para-xylene in turn is oxidized to bio-terephthalic acid through commercially known oxidation/purification processes.

Other embodiments can include multi-layer films in which each respective layer includes a bio-based polyester of at least about 21.5 pMC. For example, the layer B including a bio-based PET can have a contiguous skin layer A coextruded upon one side of layer B. If desired, a second skin layer C can be coextruded upon the side of layer B opposite the side in contact with layer A. It can be contemplated to interpose additional intermediate layers between the layers A and B and between B and C, in either symmetric or asymmetric structures. Preferably, all these additional layers—A, C, and intermediate layers—include bio-based polyester of at least about 21.5 pMC.

These skin layers A and C can be coextruded on the respective sides of the core layer B, each skin layer having a thickness after biaxial orientation between 0.1 and 10 μm, preferably between 0.2 and 5 μm, and more preferably between 0.5 and 2.0 μm. In a further embodiment in which the layer A's outer surface is used for receiving a vapor-deposited metal (and/or metal oxides or silicone oxides) or for receiving printing inks or coatings (for adhesives, gas barrier materials, solvent or aqueous) it is also contemplated to add an antiblock to aid in film handling. The bio-based layer A can be optionally surface-treated with either a corona-discharge method, flame treatment, atmospheric plasma, or corona discharge in a controlled atmosphere of nitrogen, carbon dioxide, or a mixture thereof, or to use chemical treatments such as isophthalic acid-based polyester or polyester dispersion coatings, to improve wetting tension further for the improved receptivity of the vapor-deposited metal, inks, adhesives, or coatings.

The treatment method using corona discharge in a controlled atmosphere mixture of $CO_2$ and $N_2$ (to the exclusion of $O_2$) is particularly preferred. This method of discharge treatment results in a treated surface that includes nitrogen-bearing functional groups, preferably 0.3% or more nitrogen in atomic %, and more preferably 0.5% or more nitrogen in atomic %. A wetting tension of at least 36 dyne-cm/cm$^2$ is preferred, and more preferably, a wetting tension of 39-48 dyne-cm/cm$^2$. This treated layer can then be metallized, printed, coated, or extrusion or adhesive laminated.

Additionally, in the embodiment of only a single bio-based polyester layer B, one or both surfaces of layer B may be discharge-treated for similar purposes as described above.

The bio-based layer C can be a heat-sealable layer or non-heat sealable layer contiguously coextruded with the core layer B opposite the layer A. As a heat-sealable layer, layer A may contain an anti-blocking agent and/or slip additives for good machinability and a low coefficient of friction. The heat-sealable layer will be preferably a bio-based PET copolymer or a bio-based PEF homopolymer, including at least about 21.5 pMC, and preferably about 80.6 pMC. A bio-based PET copolymer will preferably include a terephthalate-co-isophthalate copolymer with ethylene glycol, and further preferably, including at least 21.5 pMC. In the embodiment in which layer C includes a non-heat sealable, winding layer, this layer will include a crystalline PET with anti-blocking and/or slip additives. Preferably, the winding layer includes at least about 21.5 pMC bio-based polyesters.

As mentioned previously, the outer layers A and C can include antiblock and slip additives for controlling COF and web handling. These are typically solid particles dispersed within the outer layer to produce a low coefficient of friction on the exposed surface of the outer layer(s). This low coefficient of friction helps the film to move smoothly through the film formation, stretching and wind-up operations. Without such antiblocking and slip additives, the outer surfaces would be more tacky and would more likely cause the film being fabricated to stick to itself and to processing equipment causing excessive production waste and low productivity.

Examples of antiblock and slip additives that may be used for polyester film applications include amorphous silica particles with mean particle size diameters in the range of 0.050-0.1 μm at concentrations of 0.1-0.4 mass-percent, calcium carbonate particles with a medium particle size of 0.3-1.2 μm at concentrations of 0.03-0.2 mass-percent. Precipitated alumina particles of sub-micron sizes may be used with an average particle size, for example, of 0.1 μm and a mass-percent of 0.1-0.4. Additional examples include inorganic particles, aluminum oxide, magnesium oxide, and titanium oxide, such complex oxides as kaolin, talc, and montmorillonite, such carbonates as calcium carbonate, and barium carbonate, such sulfates as calcium sulfate, and barium sulfate, such titanates as barium titanate, and potassium titanate, and such phosphates as tribasic calcium phosphate, dibasic calcium phosphate, and monobasic calcium phosphate. Two or more of these may be used together to achieve a specific objective. As examples of organic particles, vinyl materials as polystyrene, crosslinked polystyrene, crosslinked styrene-acrylic polymers, crosslinked acrylic polymers, crosslinked styrene-methacrylic polymers, and crosslinked methacrylic polymers, as well as such other materials as benzoguanamine formaldehyde, silicone, and polytetrafluoroethylene.

For the embodiments in which the biaxially oriented multilayer bio-based polyester is PET-based, the coextrusion process includes a two- or three-layered compositing die. In the case where a three-layer die is employed, the bio-based polyester core layer B is sandwiched between the skin layer A and the heat sealable layer C. In general, a preferred extrusion process for producing the polyester film, masterbatch and crystallizable polyester feed particles are dried (preferably less than 100 ppm moisture content) fed to a melt processor, such as a mixing extruder. The molten material, including the additives, is extruded through a slot die at about 285° C. and quenched and electrostatically-pinned on a chill roll, whose temperature is about 20° C., in the form of a substantively amorphous prefilm. The film may then be reheated and stretched longitudinally and transversely; or transversely and longitudinally; or longitudinally, transversely, and again longitudinally and/or transversely. The preferred is sequential orientation of first longitudinally, then transversely. The stretching temperatures are generally above the Tg of the film polymer by about 10 to 60° C.; typical machine direction processing temperature is about 95° C. Preferably, the longitudinal stretching ratio is from 2 to 6, more preferably from 3 to 4.5, with typical transverse direction processing temperature about 110° C. Preferably, the transverse stretching ratio is from 2 to 5, more preferably from 3 to 4.5. Preferably, any second longitudinal or transverse stretching is carried out at a ratio of from 1.1 to 5. The first longitudinal stretching may also be carried out at the same time as the transverse stretching (simultaneous stretching). Heat setting of the film may follow at an oven temperature of about 180 to 260° C., preferably about 220 to 250° C., typically at 230° C., with a 5% relaxation to produce a thermally dimensionally stable film with minimal shrinkage. The film may then be cooled and wound up into roll form.

As described previously, one or both sides of the film can be coated or treated for adhesion promotion, surface conductivity, higher wetting tension etc. Preferred treatments include known methods such as corona treatment, plasma treatment, flame treatment, corona treatment in a controlled atmosphere of gases, and in-line coating methods.

A preferred embodiment is to metallize the discharge-treated surface of the bio-based laminate film to improve gas barrier properties such as oxygen and moisture vapor. The unmetallized laminate sheet is first wound in a roll. The roll is placed in a metallizing vacuum chamber and the metal vapor-deposited on the discharge-treated bio-based polymer resin layer surface by high speed vapor deposition metallizing processes well known in the art. The metal film may include titanium, vanadium, chromium, manganese, iron, cobalt, nickel, copper, zinc, aluminum, gold, or palladium, the preferred being aluminum. Metal oxides can also be contemplated, the preferred being aluminum oxide. The metal layer shall have a thickness between 5 and 100 nm, preferably between 20 and 80 nm, more preferably between 30 and 60 nm; and an optical density between 1.5 and 5.0, preferably between 2.0 and 4.0, more preferably between 2.3 and 3.2. The metallized film is then tested for oxygen and moisture permeability, optical density, and metal adhesion. Preferred gas barrier values are in the range of 5-50 $cc/m^2/day$ oxygen transmission rate at 23° C. and 0% RH, and more preferably less than 31 $cc/m^2/day$ or less. Preferred moisture barrier values are in the range of 0.03-0.70 $g/m^2/day$ water vapor transmission rate at 38° C. and 90% RH, and more preferably less than 0.31 $g/m^2/day$.

Thus, basic bio-based polyester film designs can be envisioned for different purposes such as metallizing, printing, coating etc. and these various films may also be combined together in laminations to provide suitable packaging films.

In a further set of embodiments, it is contemplated that a bio-based BOPET film designed as a transparent print film for receiving printing inks as described above may be laminated to a metallized bio-based BOPET film designed as a heat sealable metallizing basefilm as described above. The laminating adhesive may be solvent-borne, aqueous-borne, solvent less, or extrusion types. If extrusion, a particularly preferred extrudate would be a bio-based low density polyethylene of at least 53 pMC and preferably about or near 107.5 pMC so as to maximize overall biomass content of the lamination structure. The preferred configuration for such a laminate would be: 1) a bio-based print OPET film reverse-printed with ink; 2) an aluminum metallized bio-based heat sealable OPET with the aluminum metal deposited upon the side of the film opposite the heat sealable layer; 3) the two bio-based OPET films are then adhered to each other using molten bio-based low density polyethylene with the reverse-printed side of the bio-based print OET film adhered to the aluminum metallized side of the bio-based metallized OPP film. Other bio-based OPET film designs can be contemplated and lamination structures envisioned. Such bio-based laminations may include more than 2 films laminated together; also contemplated is a mono-layer or single bio-based OPET film used for various purposes. A preferred purpose for such contemplated laminations is for flexible packaging, in particular for snack food packaging.

Similar to the above-described method to produce bio-based BOPET films and laminates, similar films can be produced using bio-based polypropylene or bio-based polyethylene films to produce laminates or combinations of bio-based biaxially oriented polyolefin films and bio-based BOPET in laminate structures. Frequently a metalized BOPP serves as the metalized layer and clear printable BOPET serves as the non-metallized layer. A bio-based BOPP film can be made by sequential or simultaneous orientation processes well-known in the art using a core layer (B) of substantially bio-based polypropylene.

Test Methods

The various properties herein were measured by the following methods:

Oxygen transmission rate of the film was measured by using a Mocon Oxtran 2/20 unit substantially in accordance with ASTM D3985. In general, the preferred value was an average value equal to or less than 1.5 $cc \cdot mm/m^2/day$ at 73° F. (23° F.).

Moisture transmission rate of the film was measured by using a Mocon Permatran 3/31 unit measured substantially in accordance with ASTM F1249. In general, the preferred value was an average value equal to or less than 0.54 $g \cdot mm/m^2/day$ at 100° F. (38° C.) and 90% relative humidity.

Optical density was measured using a Tobias Associates model TBX transmission densitometer. Optical density is defined as the amount of light reflected from the test specimen under specific conditions. Optical density is reported in terms of a logarithmic conversion. For example, a density of 0.00 indicates that 100% of the light falling on the sample is being reflected. A density of 1.00 indicates that 10% of the light is being reflected; 2.00 is equivalent to 1%, etc.

Wetting tension of the surfaces of interest was measured substantially in accordance with ASTM D2578-67. In general, the preferred value was an average value equal to or more than 40 dyne/cm with a minimum of 36 dyne/cm.

Radiocarbon/biomass content pMC was measured substantially in accordance with ASTM D6866-10 "Renewable Carbon Testing" procedure. Analytical methods used to measure $^{14}C$ content of respective bio-based and petroleum-based polyolefin materials and articles made include Liquid Scintillation Counting (LSC), Accelerator Mass Spectrometry (AMS), and Isotope Ratio Mass Spectroscopy (IRMS) techniques. Bio-based content is calculated by deriving a ratio of the amount of radiocarbon in the article of interest to that of the modern reference standard. This ratio is reported as a percentage of contemporary radiocarbon (pMC or percent modern carbon) and correlates directly to the amount of biomass material present in the article.

Heat seal strength is measured by using a Sentinel sealer model 12 ASL at 30 psi (206.8 Pa), 0.5 second dwell time, with heated flat upper seal jaw Teflon coated, and unheated lower seal jaw, rubber with glass cloth-covered. The film is heat-sealed sealant-side to sealant-side at the desired seal temperature range and increments in the Sentinel sealer (e.g. 250-400° F. at 10° F. (121.1° C.-204.4° C. at 5.56° C.) increments) and then the respective seal strengths are measured using an Instron model 4201 tensile tester. The heat-sealed samples are cut into 1-inch (25 mm) wide strips, the two unsealed tails are placed in the upper and lower Instron clamps and the sealed tail supported at a 90° angle to the two unsealed tails for a 90° T-peel test. The peak and average seal strength is recorded. The preferred values for acceptable heat seal strength is 400 g/25 mm or greater at 300° F. (149° C.) seal temperature.

Hot tack strength is measured by using a Lako Tool hot tack/sealer model SL10 at 30 psi (206.8 Pa), 0.5 second dwell time, with heated flat lower seal jaw Teflon coated, and unheated upper seal jaw and with delay set to 0 seconds. The film sample is cut into a strip 13 inches (330 mm) long by 1 inch (25 mm) wide and fitted into the Lako SL10 film holder. The film is then heat-sealed sealant-side to sealant-side at the desired seal temperature range and increments in the Lako sealer (e.g. 180-290° F. at 10° F. (82.2° C. at 5.56° C.) increments) and then the respective hot tack strengths are measured by the Lako SL10 sealer automatically. The peak hot tack strength is recorded. The preferred values for acceptable hot tack is 150 g/25 mm or greater at 300° F. (149° C.) seal temperature.

Heat seal and hot tack seal initiation temperature (SIT) is measured by using the above methods (A) and (B) using the Sentinel 12 ASL or Lako Tool SL10 hot tack sealer. Heat seal initiation temperature is the lowest temperature at which minimum 200 g/25 mm seal strength is achieved. Hot tack initiation temperature is the lowest temperature at which minimum 150 g/25 mm hot tack is achieved. Initiation temperatures of 265° F. (129.4° C.) or less are preferred.

Transparency of the film was measured by measuring haze of a single sheet of film substantially in accordance with ASTM D1003.

COOH content of the film and resin were tested according to ASTM D 7409-07. The procedure involves the titration of the carboxyl end groups with potassium hydroxide in an o-cresol/chloroform medium to a bromophenol blue endpoint. A known weight of PET sample is dissolved in o-cresol then chloroform and bromophenol blue are added to the solution. The solution is then titrated with potassium hydroxide until the color changes to blue as a result of the end group reaction. Based on the amount of KOH required for the titration, the quantity of carboxyl end groups is calculated. A COOH content of the film 5-20 eq/ton is considered good.

Intrinsic viscosity (IV) of the film and resin were tested according to ASTM D 460. This test method is for the determination of the inherent viscosity of poly(ethylene terephthalate) (PET) soluble at 0.50% concentration in a 60/40 phenol/1,1,2,2-tetrachloroethane solution by means of a glass capillary viscometer. An IV of 0.65 to 0.75 is considered good for film.

Tensile strength and elongation percent at break of the film were determined according to ASTM D882 using a Tensilon tester. The average number of machine direction and transverse direction is used.

The Mn, Mg, and P content of the films were measured using a RIGAKU RIX 1000 X-Ray Fluorescent Spectrophotometer (FLX). This non-destructive method consists of irradiating a solid sample with an intense X-ray beam. The sample thus excited absorbs some of the energy and in turn emits X-rays along a spectrum of wavelengths characteristic of the types of atoms present in the sample; and the intensity of these emitted X-rays is proportional to the abundance of the elements in the sample. The desirable range is 50-100 ppm of Mn and/or Mg, and 30-100 ppm of P.

The melt volume resistivity of the films were measured by placing 14 grs of the material in a test tube, and then placing the tube in a block heater until the material completely melted (typically in 2-3 minutes). Next, parallel thin metal probes connected to a resistomer were dipped into the melt and the resistance was measured.

Metal adhesion was measured by heat sealing on a SENTINAL Sealer model 12 ASL at 220° F. (104.4° C.) seal temperature, 15 second dwell, and 15 psi (103.42 kPa) seal jaw pressure, a piece of 1-mil (25 μm) thick Ethylene Acrylic Acid polymer film (EAA) to the metallized surface of a single sheet of metallized film and measuring the 180° peel strength of the metal from the substrate substantially in accordance with AIMCAL (Association of Industrial Metallizers, Coaters, and Laminators) test procedure TP-105-92. The test procedure and a kit of materials can be obtained from AIMCAL's website www.aimcal.com. The Metal Adhesion Test Kit is designed to permit testing using TP-105-92. The test kit contains 2 rolls of 3M™ tape #610, 2 rolls of EAA film and an AIMCAL Metallizing Technical Reference Manual. The test kit contains enough material to do at least 100 tests as described in the Technical Reference Manual, (TP-105-92). The test procedure used in testing the samples used in the examples of this application is described in AIMCAL Metallizing Technical Reference (Third Edition, © 2001). In general, preferred values of metal adhesion ranged from about 50 g/in (50 g/25 mm) minimum or higher.

Metal appearance was rated qualitatively using a ranking system of 1-4, with 1 equating to a very matte or high density of defects (e.g. die lines, gels, etc) metallized film appearance and 4 equating to a very shiny, glossy, reflective, defect-free metallized film appearance. 8½"×11" cut sheet samples of the metallized films were observed on a white background under office fluorescent lighting, and ranked in order of metal shininess. The preferred rating is a "4" and with "2" as minimum acceptability.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A laminate film comprising:
    a biaxially oriented bio-based polyester resin-containing layer comprising crystalline polymer and having a radiocarbon content of at least 21.5 pMC,
    wherein both surfaces of the bio-based polyester resin-containing layer comprise particulate antiblock or slip additives, and
    a metal layer on a discharge-treated surface of the laminate bio-based polyester film,
    wherein the film has an oxygen transmission rate of 5-50 cc/m$^2$/day at 23 degrees Celsius and 0% RH, and a water vapor transmission rate of 0.03-0.70 g/m$^2$/day at 38 degrees Celsius and 90% RH.

2. The laminate film of claim 1, wherein the bio-based polyester resin-containing layer comprises crystalline polyethylene terephthalate.

3. The laminate film of claim 1, further comprising one or more additional layers comprising bio-based polyesters.

4. The laminate film of claim 3, wherein the additional layers comprising bio-based polyesters comprise bio-based polyethylene terephthalate homopolymer, bio-based polyethylene terephthalate-co-isophthalate copolymer, or bio-based polyethylene 2,5-furane dicarboxylate homopolymer.

5. The laminate film of claim 1, wherein the bio-based polyester resin-containing layer comprises polyester derived from plant sugars.

6. The laminate film of claim 1, wherein the metal layer is aluminum.

7. The laminate film of claim 1, wherein the metal layer has an optical density of 1.5-5.0.

8. A lamination comprising:
   a biaxially oriented bio-based polyester film (A) comprising at least about 21.5 pMC and comprising particulate antiblock or slip additives;
   a biaxially oriented bio-based polyester film (B) comprising at least about 21.5 pMC and comprising particulate antiblock or slip additives;
   an adhesive that laminates polyester film (A) to polyester film (B);
   and a vapor-deposited aluminum layer on a side of film (A),
   wherein the lamination has an oxygen transmission rate of 5-50 cc/$m^2$/day at 23 degrees Celsius and 0% RH, and a water vapor transmission rate of 0.03-0.70g/$m^2$/day at 38 degrees Celsius and 90% RH.

9. The lamination of claim 8, further comprising inks exhibiting a graphic content on a side of film (B).

10. The lamination of claim 8, wherein film (A) comprises polyethylene terephthalate homopolymer of at least about 21.5 pMC.

11. The lamination of claim 10, wherein film (B) comprises polyethylene terephthalate homopolymer of at least about 21.5 pMC.

12. A method of making a laminate film comprising:
   co-extruding a biaxially oriented bio-based polyester film (A) comprising at least about 21.5 pMC and particulate antiblock or slip additives, and a biaxially oriented bio-based polyester film (B) comprising at least about 21.5 pMC and particulate antiblock or slip additives;
   biaxially orienting the laminate film; and
   vapor-depositing an aluminum layer on a side of polyester film (A) to achieve an oxygen transmission rate of 5-50 cc/$m^2$/day at 23 degrees Celsius and 0% RH, and a water vapor transmission rate of 0.03-0.70 g/$m^2$/day at 38 degrees Celsius and 90% RH.

13. The method of claim 12, further comprising applying inks exhibiting a graphic content on a side of polyester film (B).

14. The method of claim 12, wherein polyester film (B) comprises bio-based polyethylene terephthalate homopolymer, bio-based polyethylene terephthalate-co-isophthalate copolymers, or bio-based polyethylene 2,5-furane dicarboxylate homopolymer.

* * * * *